United States Patent [19]

Pennell et al.

[11] 4,369,893

[45] Jan. 25, 1983

[54] SEALING ARRANGEMENT WITH ANNULAR FLEXIBLE DISC

[75] Inventors: William E. Pennell, Greensburg; Charles A. Honigsberg, Monroeville, both of Pa.

[73] Assignee: The United States of America as represented by the United States Department of Energy, Washington, D.C.

[21] Appl. No.: 235,371

[22] Filed: Feb. 19, 1981

[51] Int. Cl.³ .............................................. F16J 15/06
[52] U.S. Cl. ................................... 220/378; 277/236; 277/143
[58] Field of Search ................ 220/378; 277/236, 231, 277/232, 143

[56] References Cited

U.S. PATENT DOCUMENTS 3,406,863 10/1968 Wenzel et al. ................... 220/378 X
3,568,379 3/1971 Johnsson et al. ................. 220/378 X
3,841,035 10/1974 Amtmann et al. ............... 220/378 X
4,282,643 8/1981 Yamasaki et al. ............... 277/236 X

FOREIGN PATENT DOCUMENTS 334123 3/1921 Fed. Rep. of Germany ...... 220/378

Primary Examiner—Robert S. Ward, Jr.
Attorney, Agent, or Firm—K. R. Bowers

[57] ABSTRACT

Fluid sealing arrangements including an annular shaped flexible disc having enlarged edges disposed within channel-shaped annular receptacles which are spaced from one another. The receptacles form an annular region for contacting and containing the enlarged edges of the disc, and the disc is preloaded to a conical configuration. The disc is flexibly and movably supported within the receptacles so that unevenly distributed relative motion between the components containing the receptacles is accommodated without loss of sealing contact between the edges of the disc and the walls of the receptacles.

5 Claims, 8 Drawing Figures

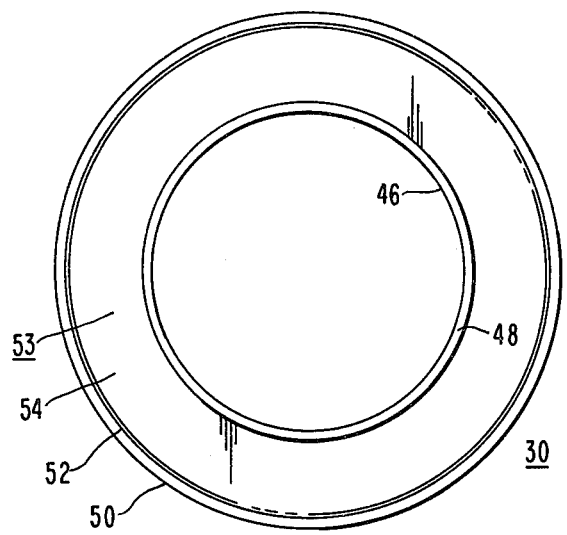
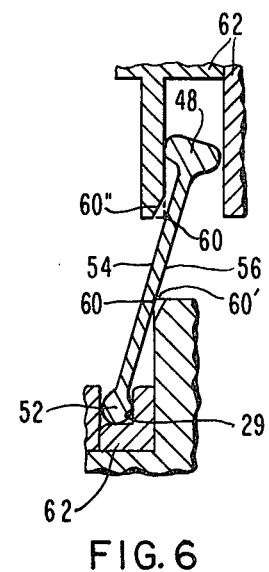
FIG. 4  FIG. 6
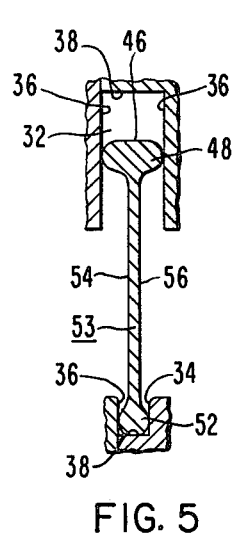
FIG. 5  FIG. 7  FIG. 8

SEALING ARRANGEMENT WITH ANNULAR FLEXIBLE DISC

GOVERNMENT CONTRACT

This invention was made or conceived in the course of or under a contract with the U.S. Government as represented by the Department of Energy, the contract being identified as No. EY-76-C-15-2395.

BACKGROUND OF THE INVENTION

For a multitude of applications it is necessary to provide total or substantial sealing among fluids. Sealing requirements become more complex where motion among components must be anticipated, such as that due to differential thermal expansion and seismic excitation, particularly where distortion of the sealing surfaces or uneven motion in more than one direction or plane is probable.

A particular example of complex sealing criteria is that presented by the interaction of the thermal liner and the outlet nozzle of a liquid-cooled nuclear reactor vessel. Such systems provide a bypass stream of reactor coolant which flows upwardly adjacent the primary reactor vessel and then about a portion of the outlet nozzle bounded by a nozzle liner. The primary purpose of the bypass flow is to protect the vessel and nozzle walls from severe thermal transients and excessively high temperatures. Accordingly, the cooler bypass flow must be substantially segregated from the hotter primary coolant which is discharged from the vessel through the nozzle and nozzle liner. The bypass flow passes about the circumference of the nozzle liner, and the primary flow passes through the circular flow area of the nozzle and its liner. The thermal liner is spaced from the vessel and outlet nozzle to define the bypass flow region.

This arrangement has been found to result in significant amounts of non-uniform motion among the thermal liner, vessel and nozzle liner, on the order of ¾ of an inch in several planes, as well as distortion of potential sealing surfaces into non-planar configurations. Sealing among the flows must not only accommodate the non-uniform relative motion, but also must operate satisfactorily, without maintenance, for the full life of the reactor, approximately 30 years. The seal must maintain resistance to leakage while exposed to high temperature liquid sodium, and must not be overstressed or impose excessive forces on the components with which it interacts.

For a number of years a plurality of alternative designs have been proposed for the sealing arrangement. The concepts considered have included welded joints, omega seals, metallic bellows, piston rings, labyrinth seals, and spring loaded shoes. However, each of these concepts has presented some undesirable characteristics for the intended service. For example, welded joints do not permit the required relative motion of the components without excessive stresses and a likelihood of rupture. Omega seals and metallic bellows cannot sustain the required directions and magnitudes of motion within allowable stress limits. Piston rings and spring loaded shoes are subject to jamming and, over the required maintenance-free lifetime, eventual excessive leakage, as well as possible spring failure. And, labyrinth seals tend to control leakage, rather than prevent it, particularly where leakage flow is unevenly distributed due to non-uniform relative motions.

Thus, it is desirable to provide sealing arrangements which will effectively seal among fluids where the components defining the flow paths of the fluids are subject to substantial multi-directional relative motion.

SUMMARY OF THE INVENTION

This invention provides sealing arrangements which effectively alleviate mixing among fluids where the components defining the fluid flow paths are subject to non-uniform relative motion and potential distortion of sealing surfaces. The invention can be applied to a variety of fluid systems, and is particularly beneficial as applied to annular sealing requirements such as the reactor vessel bypass flow and primary coolant flow in a liquid cooled nuclear reactor system.

For an exemplary reactor, a preferred arrangement includes an annular, outwardly facing, channel shaped inner receptacle surrounding the periphery of a portion of the reactor vessel outlet nozzle liner. An oppositely directed, channel shaped outer receptacle is spaced from and surrounds the inner receptacle, and is contained within a thermal liner spaced from the nozzle and the reactor vessel wall. Disposed within the annular region defined between the two receptacles is a flexible, metallic annular shaped disc.

The outer edge of the disc is enlarged, preferably bulbous in shape, and supported in the corresponding receptacle in a manner which allows asymmetric twisting and flexing of the disc, but which restrains the disc from sliding motion relative to the receptacle. This is accomplished by seating the disc outer periphery against the rear of the channel. The inner edge of the disc is also enlarged, preferably forming a T-shape with the disc body, and is supported in a manner which not only allows twisting and flexing of the disc, but also allows sliding motion relative to the receptacle. This is accomplished by configuring the disc and receptacle to provide contact among the sides of the channel and the enlarged inner edge of the disc. The inner periphery of the annualar disc, however, is spaced from the rear of the receptacle and is thus free to slide within the receptacle.

The disc is initially flat as formed. It is installed, however, in a manner which deflects the disc into a conical configuration. The conical configuration imparts a preload to the disc. The conical configuration thus provides a preload as well as the ability of of the disc to conform to non-planar displacement of the receptacles, while maintaining sealing contact.

Cooler coolant flowing in the bypass annulus and about the nozzle is maintained on one surface of the annular disc, and hotter primary reactor coolant is maintained on the other surface. Relative motion in any plane among the components housing the receptacles is accommodated by flexing or sliding of the disc. Thermal gradients imposed directly upon the disc as a result of direct contact with the hot coolant on the one hand and the cooler bypass flow on the other hand, are also accommodated by flexing of the disc. The sides of the receptacles are sized and positioned so as to allow relative motion of the disc without direct, potentially damaging contact, among the surfaces of the disc, other than the enlarged edges, and the external corners of the receptacle.

BRIEF DESCRIPTION OF THE DRAWINGS

The advantages, nature and additional features of the invention will become more apparent from the following description, taken in connection with the accompanying drawings, in which:

FIG. 4 is a frontal view of a sealing disc in accordance with the invention;

FIG. 5 is a section view of an installed sealing disc in accordance with the invention;

FIG. 6 is a section view of an installed sealing disc in an operating position;

FIG. 7 is a cross-sectional view of a type of disc in accordance with the invention, as fabricated; and FIG. 8 is a cross-sectional view of the disc of FIG. 7, in the installed configuration.

DESCRIPTION OF THE PREFERRED EMBODIMENTS

Figure 1:
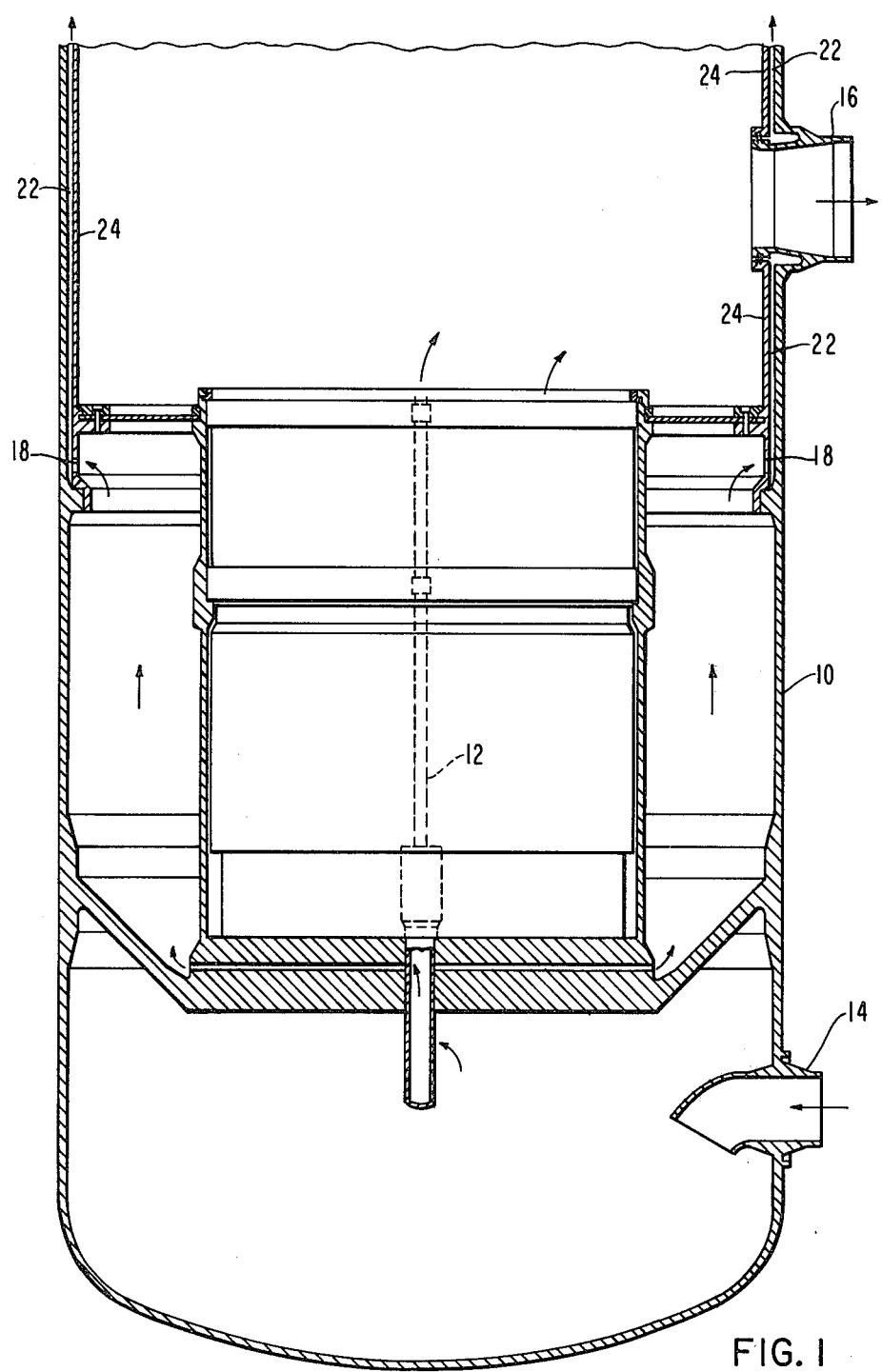
FIG. 1 is a schematic elevation view, in cross-section, of a nuclear reactor vessel and selected internal components.

Referring now to FIG. 1 there is shown an exemplary nuclear reactor vessel 10 within which is supported a core comprised of a plurality of assemblies 12 containing nuclear fuel. A reactor coolant fluid, such as helium gas, water or liquid sodium, enters the vessel through an inlet nozzle 14, flows upwardly through the assemblies 12, absorbing heat energy, and is discharged through an outlet nozzle 16 typically to heat exchange apparatus. This primary flow, upon discharge from the core, is at a high temperature. For example, in an exemplary liquid sodium cooled breeder nuclear reactor, the primary flow is at a temperature on the order of 540° C. A secondary or bypass flow path is also provided to maintain the interior of the vessel wall at an acceptably low temperature, on the order of 450° C. The bypass coolant flows through a plurality of orifices 18, and upwardly through a bypass flow annulus 22. The annulus 22 is bounded by the vessel 10 interior wall and a thermal liner 24.

Figure 2:
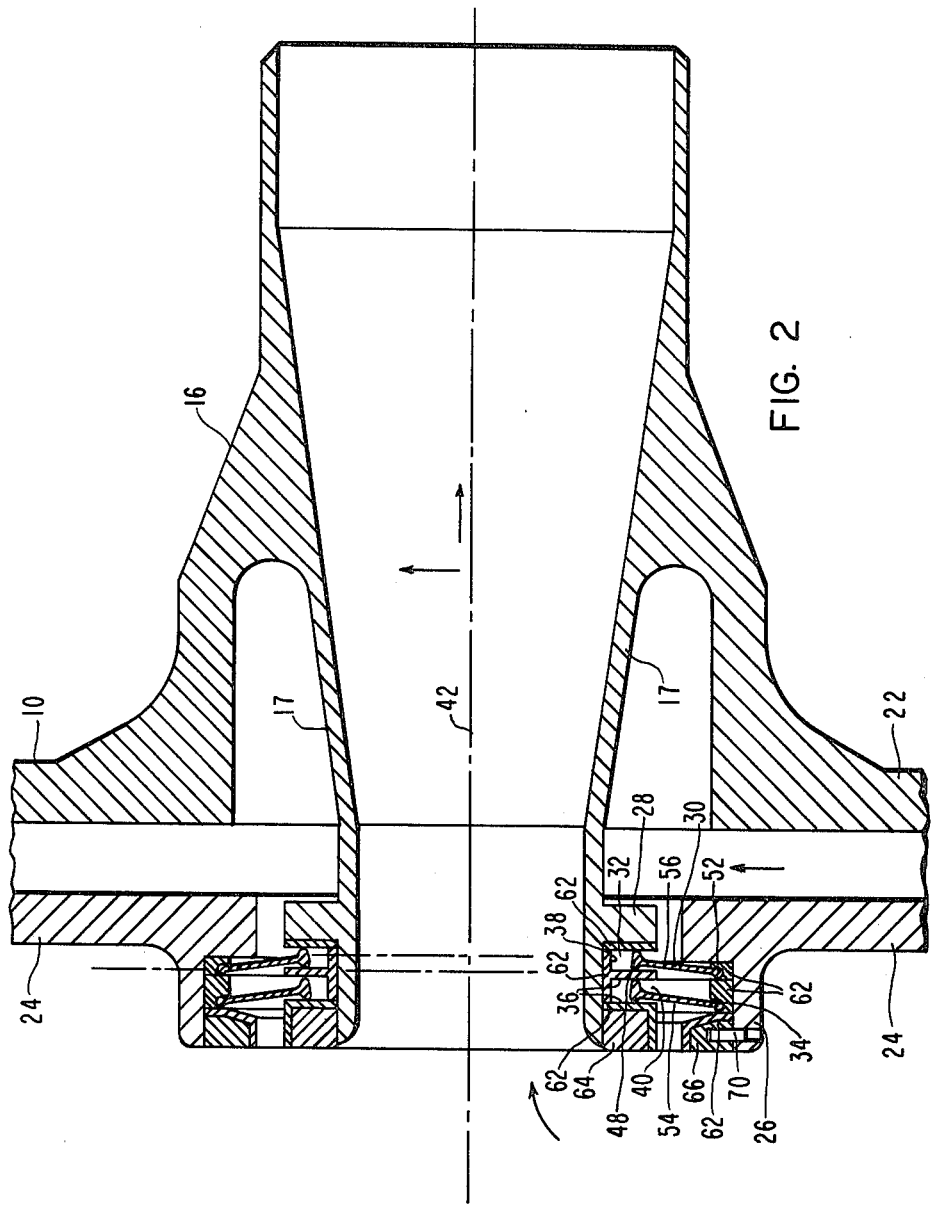
FIG. 2 is a cross-section view of the outlet nozzle region of a nuclear reactor.

The outlet nozzle 16 includes a nozzle liner 17, shown in FIG. 2. The nozzle liner 17 and the thermal liner 24 are exposed to both primary coolant and to cooler bypass coolant. The bypass flow is typically at a pressure approximately one psi higher than the outlet nozzle primary flow. It will be noted that the primary coolant flow bridges, or flows through, the coolant flowing in the bypass flow annulus 22, as it traverses the nozzle 16. Leakage of coolant between the bypass annulus 22 and the primary coolant flow area must be eliminated, or substantially alleviated, to avoid impairing the cooling of the vessel, particularly at and above the outlet nozzle region, and to avoid excessive fatigue damage due to thermal cycling at leakage locations.

Figure 3:
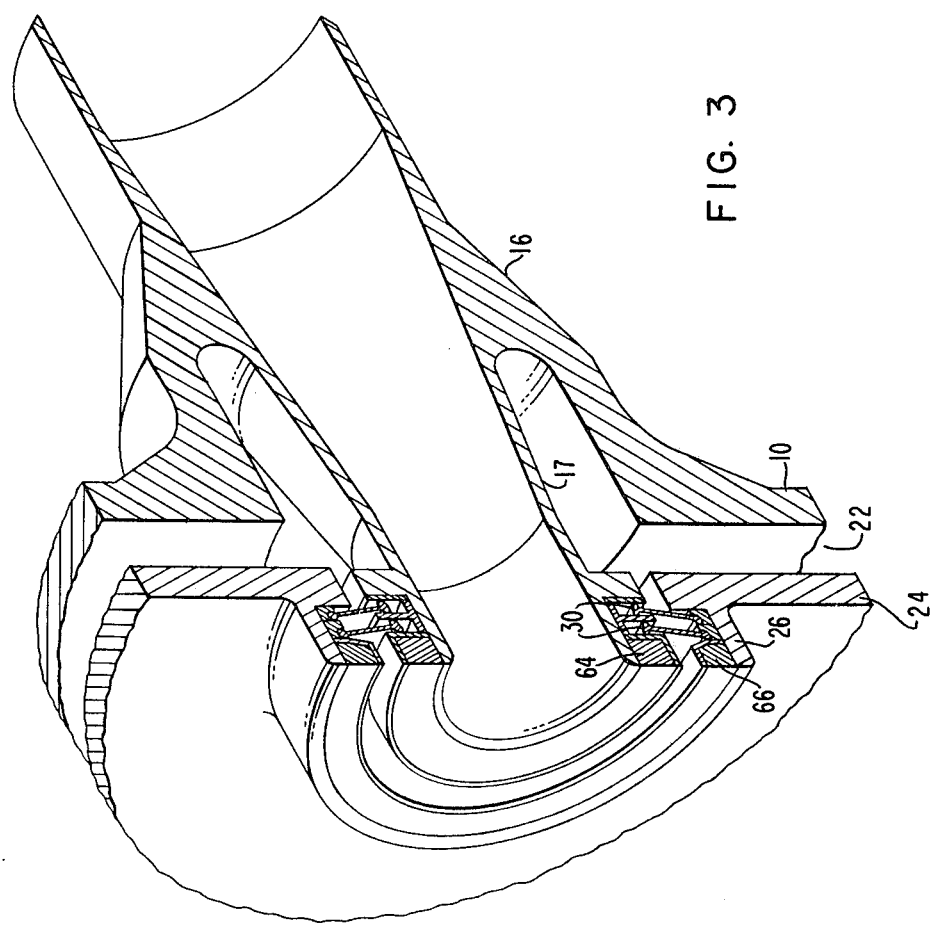
FIG. 3 is a perspective view, partially in section, also of the outlet nozzle region of a nuclear reactor.

Additional detail of the outlet nozzle region is shown in FIGS. 2 and 3. As a result of thermally induced and other stresses, there is substantial relative motion, on the order of ¾ of an inch, between the flange 26 of the thermal liner 24 and the flange 28 of the outlet nozzle liner 17. This relative motion occurs both in the axial direction (along the axis of the nozzle, left to right in FIG. 2) and in the radial direction (normal to the axis of the nozzle, top to bottom in FIG. 2). Additonally, due to an axial temperature gradient along the thermal liner 24, the initial cylindrical shape of the liner flange 28 can become slightly skewed, such that the axis of the opening in the thermal liner is no longer parallel to the axis of the outlet nozzle 16. Thermal distortions in this region can cause initially flat surfaces in thermal liner flange 28 to deviate from a plane. One or more sealing discs 30 are accordingly utilized to provide a fluid seal between the bypass flow and the primary coolant flow.

The discs 30 are flexible, and are comprised of a material selected to assure compatibility with the fluids and environmental conditions to which the discs are exposed. Dependent upon the application, such materials as ferrous and non-ferrous metals, as well as plastics and elastomers, are candidate materials.

The discs are positioned within an inner receptacle 32 and an outer receptacle 34. The receptacles 32, 34 are channel-shaped, that is, forming an annular channel having two sides 36, a rear 38, and an open front section 40. The receptacles are shown as generally rectangular in cross section, although other configurations are equally possible. The receptacles should each include, however, at least one side 36 which is flat or has a flat portion, and the rear 38 of one of the receptacles should be positioned relative to the disc 30 so as to prevent contact with the disc 30. As will become more apparent, the flat surfaces are the primary sealing regions and allow for relative motion between the disc and the receptacle without loss of sealing integrity and without binding. The inner receptacle 32 faces outwardly, away from the nozzle axis 42, and the outer receptacle 34 faces inwardly toward the nozzle axis 42. The oppositely directed receptacles are not aligned, other than for a brief period during initial installation of the disc, so as to always maintain a degree of preload.

As shown best in FIGS. 4 and 5, the inner periphery 46 of the annular sealing disc 30 is provided with an enlarged edge 48, and the outer periphery 50 of the sealing disc 30 is also provided with an enlarged edge 52. The enlarged edges 48, 52 protrude outwardly from the body 53 and surfaces 54, 56 of the disc. In preferred form the inner enlarged edge 48 forms a generally T-shaped cross-section in conjunction with the body 53 of the disc. The edge 48 contacts the sides 36 of the receptacle, but is spaced from the rear of the receptacle. The outer enlarged edge 52 forms a generally spherical or bulbous configuration, which contacts the sides of the receptacle and preferably also contacts the rear. Many other edge shapes are possible, although curved peripheries, as opposed to sharp corners, are preferred to alleviate the potential for binding among the enlarged edges and the receptacle walls.

The fluid seal is achieved in the exemplary system by metal-to-metal contact among the edges 48, 52 and the receptacles.

Contact forces are produced by several effects. One is an axial preload resulting from the in-place conical configuration of the annular disc, shown simplified in FIG. 8. FIG. 7 shows the as-fabricated flat nature of the disc, and FIG. 8 shows the truncated conical configuration. Further sealing forces are produced by the temperature difference across the thickness of the body 53 of the disc, which provides a tendency for the disc to dish so that, as viewed in FIG. 2, the disc tends to become concave on the cooler (right) surface 54 and convex on the hotter (left) surface 56. Since free axial relative motion of the disc peripheries is restrained by contact with the receptacles, metal-to-metal sealing contact occurs on the right side of the disc at its outer edge 52 and on the left side of the disc at its inner edge 48. This relation is shown, exaggerated, in FIG. 6. The sealing contact forces are maintained during all steady state reactor operating configurations and conditions, including relative motions between the thermal liner flange 26 and the outlet nozzle liner flange 28. A degree of the preload is maintained so long as opposing receptacles are unaligned. As shown in the lower portion of FIG. 6, the sealing surface 29 is flat so as to allow rotation of the bulbous edge 52 and maintenance of sealing contact. The inner and outer edges of the flexible disc will follow the respective relative motions and distortions of the components.

It will be noted from FIG. 6 that excessive displacement could result in contact of the disc surfaces 54, 56 with the corners 60 of the receptacles, for example, at the corner noted as 60′. The receptacles and disc periphery should therefore be sized and configured to avoid such contact. For example, the sides should not be excessively long. Additionally, the corners 60 can be rounded or chamfered, as shown at 60″.

As shown in FIG. 2, the receptacles can be comprised of several components. The components shown include spacer rings 62, an inner retainer 64, an outer retainer 66, and locking pins 70. In the exemplary reactor system the sealing disc 30 and spacer rings 62 are hardened alloys, coated as necessary with materials having superior friction and wear properties, for example, chromium carbide. The other components, including the nozzle and thermal liner, are preferably type 304 or 316 stainless steel.

In order to minimize leakage that bypasses the sealing discs 30 through parallel leakage paths, it is necessary to maintain a tight fit during operation between the spacer rings 62 and the flanges 26, 28. This can be achieved, for example, by shrinking the parts together during assembly or by taking advantage of differences in operating temperature and/or coefficients of thermal expansion among the components to bring the components together into tight contact.

During installation, the initially flat annular discs 30 are deflected into a shallow conical shape by applying a suitable axial force to the inner retainer 64, thus producing an initial contact and seal between the discs 30 and the spacer rings 62. Both the inner retainer 64 and the outer retainer 66 are locked to the outlet nozzle liner flange 28 and the thermal liner flange 26, respectively, by locking pins 70 or other suitable means.

The installed deflection of the discs 30 is chosen so that the desired sealing contacts will be maintained upon expected outward axial motion of the thermal liner flange 26 with respect to the outlet nozzle liner flange 28. Further, the sealing action is enhanced during operation due to the tendency of the disc 30 to flex as the result of the temperature gradient through the thickness of its body 53, with a higher temperature on surface 54 compared to the temperature on surface 56.

It will be apparent that the flexible discs 30 are capable of absorbing complex combinations of relative motion of the containing components, including an uneven waviness between the thermal liner flange 26 and the nozzle liner flange 28. Additional modifications of the annular disc arrangement are also possible for the exemplary and other applications. The discs can be supported and more restrained at the inner edge, and free to slide at the outer edge. The discs and receptacles can be comprised of various materials, or coated with materials such as chromium carbide which reduce friction and wear at the sliding surfaces. The thickness and mechanical characteristics of the disc can be selected to achieve any desired spring rate, reaction forces, stresses and flexibility. The disc can take a selected configuration on the inner edge, and a somewhat different configuration on the outer edge, dependent upon the shape of the retaining components.

It is important, however, that the disc be supported between unaligned components so as to force the disc into a generally conical configuration with a tendency to dish.

Many additional modifications are possible in the described arrangement without departing from the spirit and scope thereof. It therefore is intended that all matter contained in the foregoing description or shown in the accompanying drawings be interpreted as illustrative, and not in a limiting sense.

We claim:

1. An arrangement for creating a fluid seal between a first component having a portion through which a fluid flows, and a second component radially surrounding said first component and said portion so as to form an annulus between said components, comprising:
    a generally channel-shaped inner annular receptacle, affixed about an exterior portion of said first component and said portion, having a central axis, an outwardly facing open front section, and being positioned in a first radial plane;
    a generally channel-shaped outer annular receptacle, affixed about an interior portion of said second component and said portion, having a central axis coincident with said central axis of said inner receptacle, an inwardly facing open front section, and being positioned in a second radial plane, said first and second radial planes being displaced from one another along said axes; and
    an annular-shaped flexible disc having a body, an inner edge disposed within and contacting said inner receptacle, and an outer edge disposed within and contacting said outer receptacle, whereby said disc is maintained in a generally conical configuration.

2. The arrangement of claim 1 wherein said inner and outer edges are enlarged relative to the body of said disc, one of said edges being slidable in a radial direction within the corresponding receptacle, and the other edge being restrained from sliding motion in a radial direction within its corresponding receptacle.

3. The arrangement of claim 2 wherein said slidable enlarged edge extends from said body so as to form a T-shaped cross section with said body of said disc, and wherein said other edge is bulbous shaped.

4. The arrangement of claim 3 wherein each said receptacle includes two sides and a rear, one of said sides, of each said receptacle, having a flat portion in contact with the corresponding enlarged edge disposed therein.

5. A sealing arrangement for a liquid-cooled nuclear reactor having a vessel, an annular nozzle liner and a thermal liner, said thermal liner spaced from said vessel and about said nozzle liner so as to form a bypass flow region extending adjacent said vessel and about said nozzle liner, said arrangement comprising:
    a channel-shaped inner annular receptacle having an outwardly facing open front section, said inner receptacle being affixed to said nozzle liner;

a channel-shaped outer annular receptacle having an inwardly facing open front section, said outer receptacle being affixed to said thermal liner and being spacedly disposed about said inner receptacle, said inner and outer receptacles being disposed in different planes; and an annular-shaped flexible disc having a body, an inner edge disposed within and contacting said inner receptacle, and an outer edge disposed within and contacting said outer receptacle, whereby said disc is maintained in a generally conical configuration.

* * * * *